United States Patent [19]
Johnson

[11] 3,966,373
[45] June 29, 1976

[54] APPARATUS FOR THE CONTINUOUS EXTRUSION OF SMALL CROSS-SECTION THERMOPLASTIC FOAM PROFILES

[75] Inventor: Keith G. Johnson, Pittsburgh, Pa.

[73] Assignee: ARCO Polymers, Inc., Philadelphia, Pa.

[22] Filed: Jan. 22, 1975

[21] Appl. No.: 542,973

Related U.S. Application Data

[62] Division of Ser. No. 419,811, Nov. 28, 1973, abandoned.

[52] U.S. Cl. .............................. 425/4 C; 425/235; 425/324 R; 425/335; 425/363; 264/54
[51] Int. Cl.² ................................................ B29G 7/00
[58] Field of Search ............... 425/324 R, 328, 194, 425/308, 335, 394, 336, 369, 396, DIG. 235, 4 R, 4 C; 264/47, 48, 51, 175, 176, 54

[56] References Cited
UNITED STATES PATENTS

| | | |
|---|---|---|
| 2,323,862 | 7/1943 | Zimmerman et al. .............. 425/335 |
| 2,349,829 | 5/1944 | Nydegger et al. ................ 425/335 X |
| 2,620,513 | 12/1952 | Cryor et al. ...................... 425/335 X |
| 3,700,368 | 10/1972 | Wells ................................ 425/4 C X |
| 3,857,664 | 12/1974 | Johnson et al. ............. 425/DIG. 235 |

Primary Examiner—Robert L. Spicer, Jr.
Attorney, Agent, or Firm—Lewis J. Young

[57] ABSTRACT

Thermoplastic polymers containing a blowing agent are extruded into an unconfined zone and allowed to partially expand. The polymers are then conveyed through a confined moving passage of predetermined configuration formed, for example, by intermeshing cooled rolls, to shape the extrudate to the predetermined configuration and solidify the surface layers. The extrudate is further cooled by subjecting alternate surfaces to cooled roll surfaces, whereby a continuous ribbon, or shaped extrudate, having a dense skin and a foamed core is formed. The method is particularly applicable to small cross-section profiles which can be cut into short lengths to be useful as ice-cream sticks or tongue depressors.

1 Claim, 5 Drawing Figures

APPARATUS FOR THE CONTINUOUS EXTRUSION OF SMALL CROSS-SECTION THERMOPLASTIC FOAM PROFILES

This is a divisional of application Ser. No. 419,811 filed Nov. 28, 1973, now abandoned.

BACKGROUND OF THE INVENTION

This invention relates to a method and apparatus for forming small, or thin cross-section foam profiles having a structural skin and a foamed core.

In my copending application Ser. No. 227,575, now U.S. Pat. No. 3,922,328, filed Feb. 18, 1972, I have described a method and apparatus for making structural foam profiles having large cross-section by drawing partially expanded resin material through a chilled shaping or sizing die. The material continues its expansion in the interior of the profile with resultant development of porosity in the core of the profile while the surface layer is cooled and hardens as a substantially unexpanded structural shell. A disadvantage of the method described in application Ser. No. 227,575 is that the shaping die is stationary and hence the interface between the die and the moving resin profile may be lubricated to prevent friction and/or scoring of the surface of the profile.

SUMMARY OF THE INVENTION

It has now been found that structural foam profiles may be made by conveying partially expanded thermoplastic material through a chilled shaping passage which moves at the same speed as the moving profile, thereby eliminating any friction between the surfaces of the profile and the passage and preventing scoring of the surface of the profile. The moving shaping passage comprises an arrangement of chilled rolls wherein a projection on one roll intermeshes with a groove on another roll to form a passage through which the partially expanded material is passed and shaped. The surface layers of the profile are chilled by the cool rolls during the forming process while the core of the profile is still expanding. The pressure developed by the expanding foaming agent in the core of the profile against the cooled surface layer forms a dense skin on the profile. Thus, a profile having a dense skin and a foamed core is formed.

BRIEF DESCRIPTION OF THE DRAWINGS

FIG. 4 is a partial view of a roll arrangement similar to that of FIG. 2 looking into the sizing passage having different shape than that of FIG. 2a.

DETAILED DESCRIPTION OF THE INVENTION

Figure 2A:
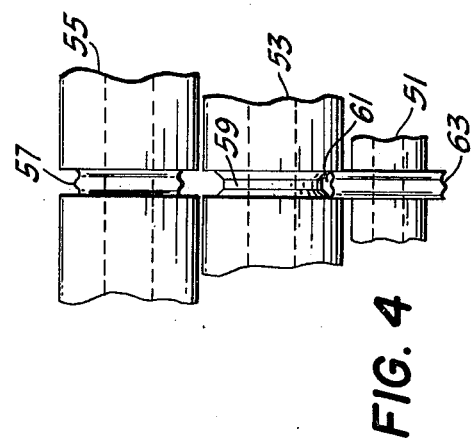
FIG. 2a is a partial view of the roll arrangement of FIG. 2 looking straight into the sizing passage.
Figure 2:
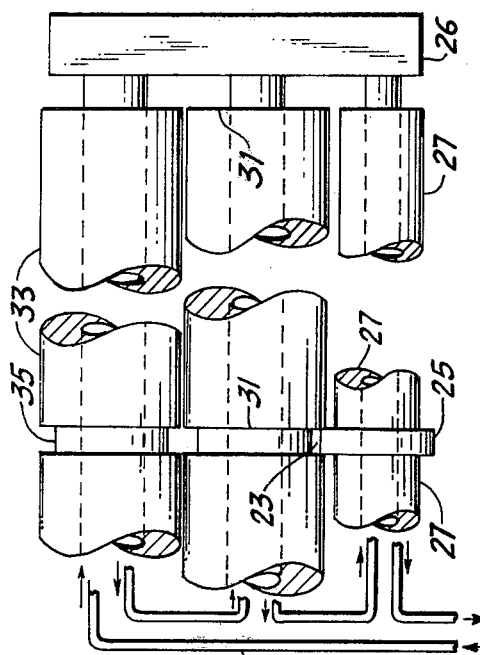
FIG. 2 is an enlarged section of the extruder die and the sizing roll arrangement shown from the side.
Figure 1:
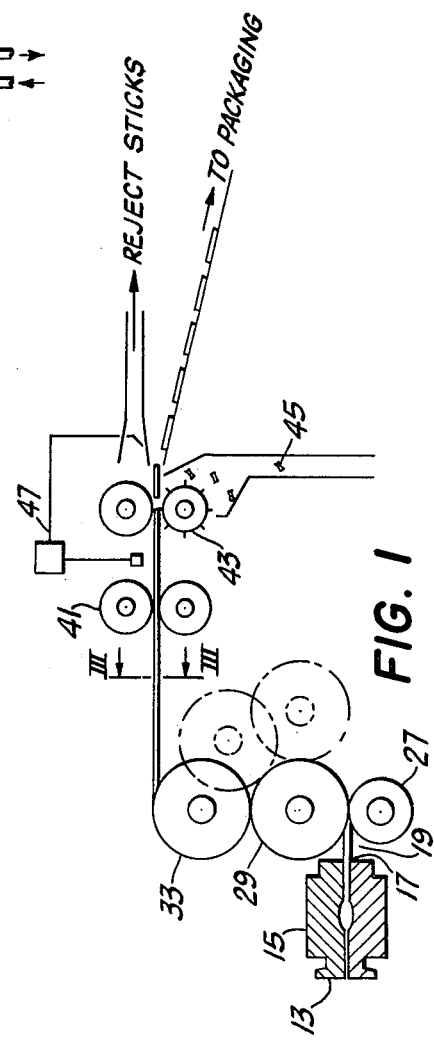
FIG. 1 is a schematic diagram of the apparatus for one embodiment of the invention, including an extruder die, a sizing roll arrangement, a take-off means with cutter station and product removal.

In the embodiment shown in FIGS. 1 and 2, an extruder (not shown) of the screw type is usually attached to inlet side, 13, of the die, 15. The die, 15, has a circular discharge orifice, 17, and preferably has long land lengths in the die to provide appreciable back pressure and thus assure maintenance of a pressure on the thermoplastic material until its delivery from the discharge orifice. The extruder is provided with the normal extruder heating means (not shown) to soften the thermoplastic material to allow even flow of the material through the die.

In a position spaced beyond the discharge orifice of the die, is a sizing roll arrangement supported by a stand (not shown). The first roll, 27, has a projection, 25, which is rectangular in the FIG. 2a. The projection may have any desired shape to provide the desired cross-section to the sizing passage. A second roll, 29, has a groove, 31, which is also rectangular in the figure. The groove may also have any desired shape to provide the desired cross-section to the sizing passage. Rolls 27 and 29 are mounted in the support stand adjacent to one another and aligned so that the projection, 25, intermeshes with the groove, 31, to form a sizing passage, 23. A third roll, 33, is provided with a groove, 35, which is also shown as rectangular and is identical in size and shape with the groove, 31, in roll 29. In an embodiment having a projection, 25, of shape other than rectangular, the groove 35, in roll 33 must conform to the shape of the projection 25 in order to allow efficient cooling of the side of the extrudate adjacent the roll 33. Roll 33 is shown mounted directly above roll 29 so that the three rolls are all in a vertical line. In this position, maximum cooling of the sized extrudate is possible. Roll 33 is adjustable to any position with relation to roll 29, as shown in FIG. 1, from vertically above to horizontally beside. The groove, 35, in roll 33 must be aligned with the groove, 31, in roll 29. The rolls, 27, 29, and 33 are all internally cooled by cooling means, 24, and driven by drive means, 26, so that the peripheral speed is the same on all three rolls.

In considering the operation of the system shown in FIGS. 1 and 2 it is first pointed out that the cross-section of the die orifice need not conform either in size or shape with the size and shape of the sizing passage formed by the rolls. The extruder delivers the softened expandable thermoplastic material into the unconfined zone, 19, lying between the die orifice, 17, and the entrance opening of the confined passage, 23, or sizing passage. Because of the release of the pressure within the material at this point, the material partially expands and forms a mass or glob, 21, at the entrance of the sizing passage. As the intermeshing, internally cooled rolls, 27, and 29, rotate, the mass, 21, is passed into the sizing passage, 23. The cross-sectional size of the mass, 21, is greater than the cross-sectional size of the confined passage 23. As the partially expanded material enters the confined passage, the surface portions are immediately chilled by the cooled surfaces of the rolls, causing the surface portions of the formed extrudate to solidify. The internal pressure of the extrudate as it enters the confined passage is also increased, which helps to form the solid, structural skin on the formed extrudate. The material in the core portion of the extrudate continues its expansion as it is being conveyed through the sizing passage. The net effect in the sizing passage is that the surface layers are solidified in a substantially unexpanded state while the core expands to a porous foam core. The pressure developed by the expanding core serves to maintain the external surfaces of the extrudate in contact with the surface of the confined passage, 23, and results in the extrudate being formed into the shape of the confined passage.

Since the formed extrudate is passed or conveyed through confined passage by the moving rolls, in effect the sizing passage is moving at the same speed as the extrudate being formed. This eliminates the frictional forces which would have been encountered if the extrudate had been formed by pulling it through a stationary die, as in my copending application Ser. No. 227,575, filed Feb. 18, 1972.

The formed extrudate continues around roll 29, confined in the rectangular groove, 31, whereby the surface next to the roll is further cooled. The formed strip is then transferred to the groove, 35, in the roll, 33, whereby the opposite surface of the extrudate is further cooled. By adjusting the cooling rate imposed on the extrudate by roll 29 with respect to the rate of cooling by roll 33, warpage of the sized extrudate can be eliminated. The formed and cooled extrudate is then removed from roll 33, through the nip rolls, 41, to the cutting station, 43, where the extrudate is cut into desired lengths. The scrap cuttings are collected at 45, while the quality control means, 47, sorts the good extrudate from the rejects.

The process described is especially useful for extruding thin-section, rectangular cross-sectioned strands or ribbons which can be cut to lengths to be used as, for example, ice-cream sticks or tongue depressors. The addition of embossed patterns to the groove, 31, or the projection, 25, imparts a duplicate embossment to the extrudate surface. Various shapes of extrudates can be produced which are useful as picture frames, or decorative veneers for the furniture or other wood working industries.

Figure 4:

One such variation of extrudate shape is the cove molding shape as shown in FIG. 4. Note that the groove, 57, of roll 55 matches the shape of the projection, 63, of roll, 51. The shaping, confined passage, 61, formed between projection, 63, of roll, 51, and groove, 59, of roll, 53, forms the extrudate into the desired cove-molding.

Figure 3:
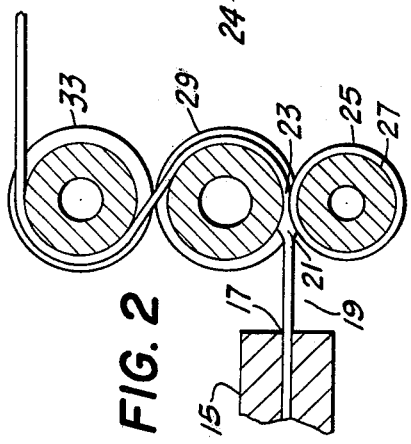
FIG. 3 is an enlarged cross-sectional view of a piece of the profile made in accordance with the system of FIGS. 1 and 2.

In FIG. 3 there is illustrated cross-section of the rectangular ribbon made in accordance with the embodiment of FIGS. 1 and 2. In FIG. 3, the dense outer skin is indicated at 37, and the porous core is shown by stippling at 39.

Materials for use in the practice of this invention can be any expandable thermoplastic material. Examples of thermoplastic materials that can be used are: homopolymers and copolymers of vinyl aromatic compounds such as polystyrene, polyvinyl toluene, homopolymers of alpha-methylstyrene and 2,5-dichlorostyrene, acrylonitrile-butadiene-styrene copolymers and styrene-butadiene copolymers; polyamides such as polyhexamethyleneadipamide (nylon 6/6), polycaprolactam (nylon 6) and polyamides prepared by reacting hexamethylene diamine with sebacic acid; polymers prepared from the monoolefins such as polyethylene, polypropylene, polybutylene and polyisobutylene; vinyl polymers such as polyvinyl chloride, polyvinyl acetate and polyvinylidene chloride; polyacrylics such as polyacrylic acid, polymethyl methacrylate, acrylonitrile-butadiene copolymers; vinyl others such as polyvinyl methyl ether; cellulose esters such as cellulose acetate, cellulose butyrate and cellulose propionate, or mixtures thereof.

The material is made expandable by the use of an expanding agent which will produce voids or bubbles in the material as the pressure on the material is reduced when the material exits from the extruder into the free space provided before the material reaches the sizing passage, and foaming or expanding continues in the interior of the extrudate while the external shell is solidified in the sizing passage. Expanding agents which will effect such expansion include many which have heretofore been used in various other techniques for making expanded polymer articles. Exemplary classes of expanding agents that can be used are: normally gaseous materials; normally liquid materials which volatize readily, and normally solid materials which upon reaction or decomposition, usually effected by heating, evolve a gas as one of the decomposition or reaction products. The expanding agent and the amount used for any particular application will be governed generally by the specific polymer that is being foamed and molded and by the extent and type of foaming that is desired in the product.

Examples of normally gaseous materials which can be combined with the foamable polymer under pressure and which are capable of foaming the polymer as the pressure is reduced include nitrogen, carbon dioxide, lower molecular weight paraffins such as propane and butane, methylchloride, lower molecular weight olefins such as ethylene, propylene, and butylene or mixtures of the above. Gaseous materials of this type can be injected directly into the thermoplastic material in the extruder used.

Examples of normally liquid materials which under the influence of heat volatalize at temperatures near those at which the polymer is rendered soft and flowable include: liquid fluorocarbons such as 1,2-dichlorotetrafluoroethane; methylchloride; paraffins such as pentane and hexane, and other relatively low boiling hydrocarbons, or mixtures thereof. Upon heating a mixture of the expandable polymer and normally liquid blowing agent, the liquid volatalizes and the resulting gas effects foaming of the polymer as pressure on the polymer is reduced. Such liquid blowing agents can be combined with the polymer according to available techniques. For example, polymer particles can be coated or impregnated with the liquid blowing agent or the liquid blowing agent can be incorporated into the polymerization reaction mixture from which the polymer is produced thereby providing polymer particles having integrated therein the blowing agent.

Examples of normally solid materials which decompose to evolve a gas include azodicarbonamide, 1,1′-azobisformamide, dinitroisopentamethylenetetramine, barium azodicarbonate and ammonium and potassium bicarbonate. Materials which react to liberate a gas include, for example, the combination of an alkali or alkaline earth carbonate or bicarbonate, for example, sodium bicarbonate, and an organic acid such as citric acid; a reaction product of these materials is carbon dioxide gas which effects expansion of the polymer. Such normally solid materials which evolve a gaseous expanding agent can be dry blended readily with particles or beads of the polymer.

The amount of expanding agent that can be incorporated in the expandable polymer can vary over a wide range, for example, from about 0.3 to about 15 wt %. As mentioned above, the amount of expanding agent used will be determined generally by the specific expanding agent used, the specific polymer being foamed and the extent and type of foaming that is desired in the product.

For preparing foamed articles such as boards, rods, ribbons, or other profiles or structural shapes, it is preferred to use polymers of styrene including homopolymers of styrene, copolymers of styrene and modified polystyrenes.

Some examples of preferred expandable polymers of styrene for use in the practice of this invention are as follows. One type of preferred expanding styrene polymer (described in U.S. Pat. No. 2,983,692) is prepared by adding to the aqueous suspension polymerization reaction mixture from which the polymer is made a normally liquid blowing agent such as a petroleum ether, certain ligroines, pentane and hexane. The reaction product comprises polymeric particles or beads which have integrated therewith the blowing agent. The blowing agent selected for use with any particular polymer should be volatile and boil somewhat below the incipient softening point of the polymer. Such blowing agents can have a boiling point within the range of about 30°C. to about 100°C., preferably about 35°C. to about 65°C., and can be added to the reaction mixture in amounts from about 5 to about 30 parts per 100 parts of the expandable polymeric particles or beads produced. Upon heating the particles to their incipient softening point or higher, the blowing agent volatizes and the discrete polymeric particles coalesce to form a cellular polymeric structure. Examples of expandable styrene polymers that can be prepared in this manner include: polystyrene, a homopolymer of dimethylstyrene, styrene-butadiene copolymer, a copolymer of styrene and alpha-methyl styrene, a terpolymer of styrene, butadiene and alpha-methyl styrene, a copolymer of styrene and isobutylene, a copolymer of styrene and dimethyl styrene, and impact polystyrene which is an admixture of polystyrene with an elastomer such as, for example a styrene-butadiene copolymer.

Another preferred expandable styrene polymer that can be used in the practice of this invention comprises polystyrene particles or beads having integrated therewith a normally liquid blowing agent and a carbon dioxide liberating agent, for example a mixture of an alkali or alkaline earth carbonate or bicarbonate and an organic acid. The normally liquid blowing agent, having a boiling point of about 30°C. to about 90°C., can be incorporated in the polystyrene by adding it to the aqueous suspension polymerization reaction mixture from which the polystyrene is prepared in amounts of about 4.5 to about 9%. The carbon dioxide liberating agent can thereafter be admixed with the resulting polystyrene particles or beads in amounts sufficient to produce upon reaction a total of about 0.1 to about 5 wt %, based on the expandable beads, of water and carbon dioxide. The organic acid should have at least about 3.0 milli-equivalents of acidic hydrogen per gram. Examples of acids which can be used are citric acid, diglycollic acid, tartaric acid and succinic acid. Expandable polystyrenes of this type can be used to produce foamed or cellular articles having relatively smaller and more uniformly sized voids or cells. Such expandable resins are described in U.S. Pat. No. 2,941,964.

The same type of expandable polymer as described immediately above can be prepared by an alternative method, as described in U.S. Pat. No. Re. 26,278. A mixture of two types of polystyrene particles, one type comprising the polystyrene having the organic acid incorporated therein and the other comprising the polystyrene with the carbonate or bicarbonate incorporated therein. A normally liquid blowing agent can be incorporated into one or both types of the resin particles.

Another type of expandable polymer (described in U.S. Pat. No. 3,457,205) that can be used in practice of this invention is one which comprises expandable polystyrene beads, a non-expandable thermoplastic polymer powder and a hydrate containing at least 25% by weight of chemically bound water, such as, for example, hydrates of cupric sulfate, ferrous sulfate and sodium carbonate. This type of composition, upon being extruded and advanced through the sizing passage produces an article, the skin or outer layer of which is comprised of the non-expandable thermoplastic polymer. In this manner, foamed articles with a relatively integral protective coating can be produced. This type of polymer can comprise expandable polystyrene beads, about 0.33 to about 3 parts by weight of the non-expandable thermoplastic polymer powder and about 3 to 40% by weight of the hydrate. Examples of the non-expandable thermoplastic polymer that can be used include polyethylene, ethylene-vinyl acetate copolymer, polystyrene, polyvinyl chloride, polyamides and polyacrylates.

For preparing the thin-section structural foam articles, such as ice-cream sticks or tongue depressors, a highly preferred thermoplastic material is a blend of the following composition:
a. about 5% by weight of expandable polystyrene beads containing about 6.5 to 7.0% by weight of n-pentane, about 0.1 – 0.5% by weight of citric acid, and up to 0.4% by weight of sodium carbonate;
b. about 85% by weight of unmodified polystyrene; and
c. about 10% by weight of impact polystyrene comprising a graft polymer of styrene on polybutadiene or a blend of polystyrene and polybutadiene wherein the polybutadiene content of the graft polymer can comprise 1.5 – 7.5% by weight.

Such polymers can be used to produce foam products having a density within the range of about 20 to about 60 pounds per cubic foot, depending on the temperature of the extrudate, the cooling applied and the speed of the sizing rolls, which affects the amount of time that the extrudate has to expand.

Some modifications can be made to the above foamable composition to achieve certain desired properties in the foamed profile. For example, the impact polystyrene can be replaced by low density or high density polyethylene or by an acrylonitrile-butadiene-styrene resin or by a general purpose polystyrene. Also the expandable polystyrene of the above-described composition or the aforementioned modified compositions can be replaced with about 1 to about 10 wt. % of a normally solid blowing agent which decomposes to evolve a gas. Examples of such agents include p,p'oxybis(benzenesulfonyl hydrazide), azo-bis-butyronitrile, azodicarbonamide and carbonate esters used in combination with an activator to promote the release of gas, for example, sodium carbonate and succinyl mono glycerin carbonate.

Other materials or additives generally incorporated into expandable compositions can be included in the foamable thermoplastic compositions which are expanded and foamed according to the method of the present invention. Examples of such additives include heat and light stabilizers, antioxidants and lubricants. Coloring agents such as pigments and dyes can be added also to the expandable composition for the purpose of producing colored and decorative articles. Conventional amounts of such additives and agents can be used.

Fillers can be added also to the foamable thermoplastic compositions. Examples of fillers include calcium carbonate, fibrous reinforcements such as glass fibers, cellulose and asbestos fibers. The fillers can be used in conventional amounts, according to the desired characteristics of the finished product.

What is claimed is:

1. Apparatus for making continuous extrudate having a predetermined cross section profile, from thermoplastic material containing a blowing agent, comprising:
   a. extrusion means for forcing said material in a molten condition through a die connected to said extrusion means;
   b. a confined passage of predetermined configuration comprising:
      1. a first roll having a projection on its surface, internal means for cooling said first roll, and means for rotating said first roll;
      2. a second roll having a groove in its surface, internal means for cooling said second roll, and means for rotating said second roll;
      3. said first and second rolls being located adjacent one another, but touching only in the area of said confined passage, such that the projection of the first roll intermeshes with the groove in the second roll; and
      4. the height of said projection beyond the first roll being less than the depth of said groove in the second roll such that when said projection intermeshes with said groove, a confined passage of predetermined configuration is defined between the top of said projection and the bottom of said groove;
   c. said confined passage being spaced apart from said die to provide an unconfined zone therebetween;
   d. a third roll having a groove in its surface, internal means for cooling said third roll, and means for rotating said third roll; said third roll being located adjacent but not touching said second roll such that the grooves on the two rolls are in alignment; and
   e. means for removing said extrudate from said third roll; whereby said extruded material is formed in said confined passage, thereafter confined solely first within said groove in said second roll and secondly within said groove in said third roll.

* * * * *